Aug. 30, 1966  C. GARNER, JR  3,269,483
SEAT BELT SAFETY SYSTEM FOR MOTOR VEHICLES
Filed Aug. 7, 1964  2 Sheets-Sheet 1
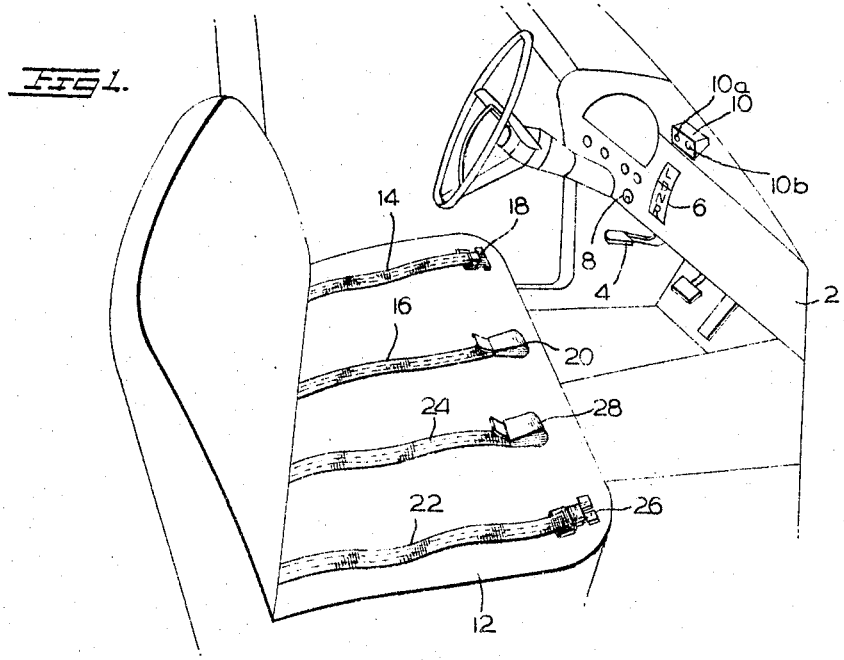
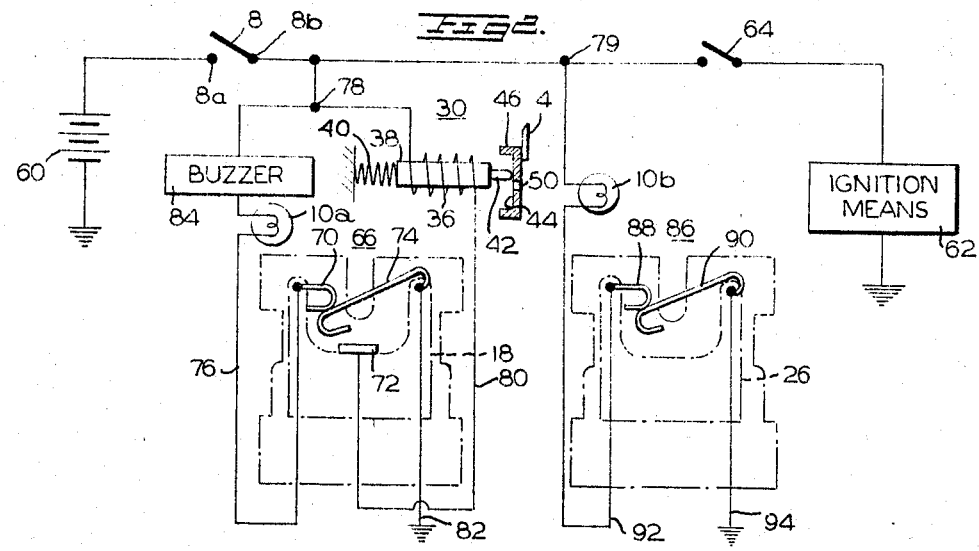
INVENTOR
CLARKE GARNER JR.
BY *Lawrence C. Laubscher*
ATTORNEY

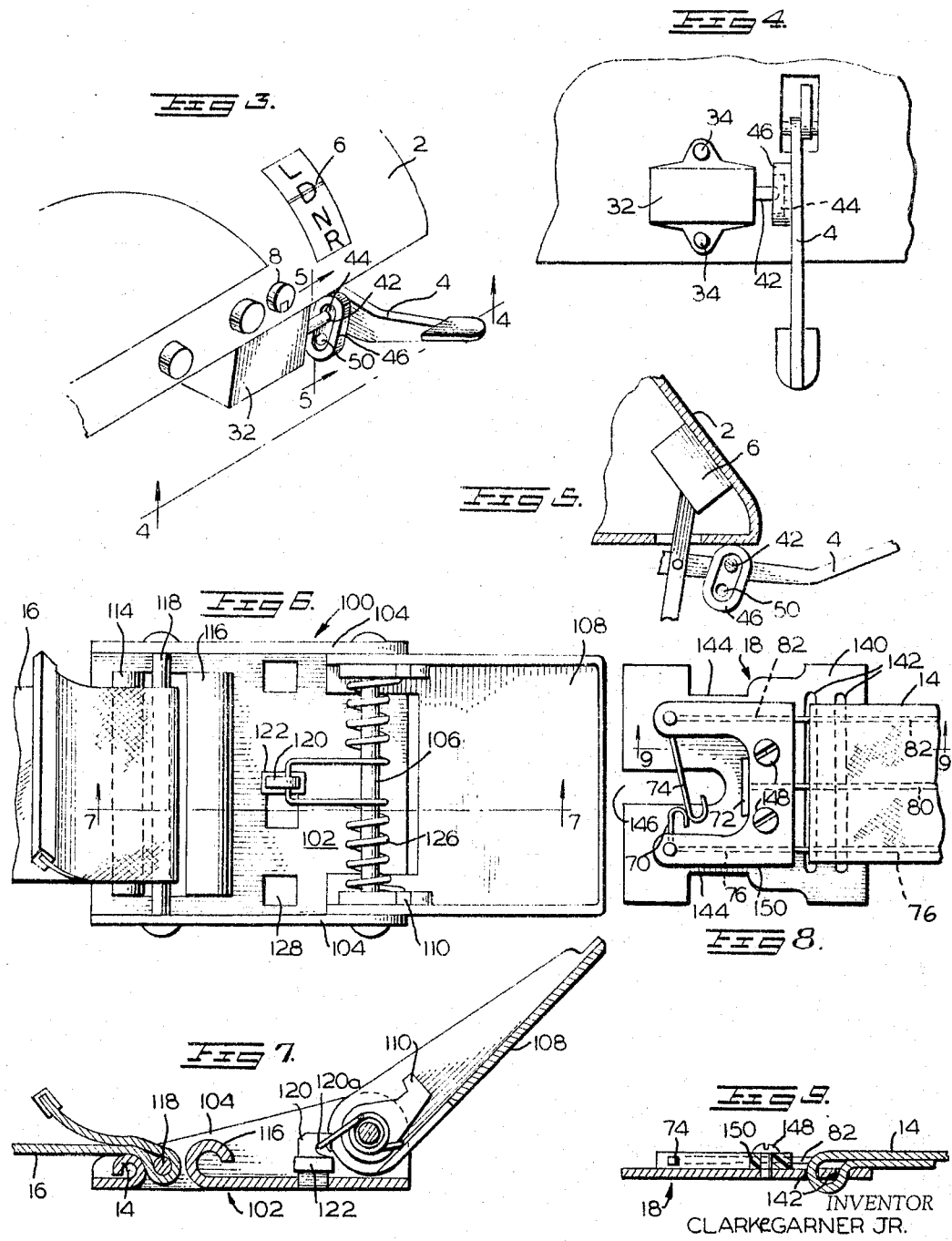

United States Patent Office 3,269,483
Patented August 30, 1966

3,269,483
SEAT BELT SAFETY SYSTEM FOR MOTOR
VEHICLES
Clarke Garner, Jr., Charlotte, N.C., assignor of forty-nine
percent to Henry P. Cassidy, Adelphi, Md.
Filed Aug. 7, 1964, Ser. No. 388,221
8 Claims. (Cl. 180—82)

This invention relates generally to a safety system for motor vehicles, and more particularly to a safety system that prevents an operator from shifting the transmission gear selector means from an engine starting position until the operator's safety seat belt is properly fastened.

Safety seat belt systems have been proposed in the patented prior art for actuating a visible or audible alarm when the seat belt buckles are in an unfastened condition. An example of such a know system is presented by the Meinhardt Patent No. 2,824,293 of February 18, 1958. Other seat belt systems have been proposed (for example, as taught by the Simon Patent No. 2,802,073 of August 6, 1957) for preventing the starting of a vehicle engine until the operator's seat belt buckles are fastened, and for opening the electrical ignition circuit in the event that the seat belts are unfastened with the vehicle in operation.

There are situations, however, when it may be desirable to start an engine with the seat belt buckles unfastened, but to prevent operation of the vehicle until at least the driver's seat belt buckles are fastened. Furthermore, there are situations when it may be desirable for an operator to temporarily unfasten his seat belt buckles when the vehicle is in a driving condition without causing interruption of the electrical ignition circuit. Moreover, to prevent inadvertent release of an unattended parked vehicle, or unauthorized transport of a vehicle in a parked, locked condition, it is desirable to provide means for automatically locking the vehicle transmission in a given gearing condition (normally, a "park" or "neutral" condition) whenever the associated gear selector means is shifted to the corresponding position. The present invention was developed to avoid the disadvantages of the known safety systems and to provide an improved safety seat belt system that meets the desired criteria set forth above.

Accordingly, a primary object of the present invention is to provide a safety seat belt system including means for automatically locking the transmission of a motor vehicle in an engine starting condition, and means responsive to the fastening of the seat belt of the vehicle operator for releasing the transmission locking means. In accordance with the present invention, the transmission locking means includes means that cooperate with the gear selector means to automatically lock the same in an engine starting position when the ignition system is de-activated and when the selector means is shifted to the said engine starting position. Upon closing of the electrical ignition system, the selector locking means remains operable until the driver's seat belt buckles are safely fastened, regardless of whether or not the vehicle's engine has been started. Upon fastening of the operator's seat belt, the locking means are disabled, whereupon the selector means is released to permit shifting of the transmission to the various drive conditions.

A more specific object of the invention is to provide a safety seat belt system including means for automatically locking the gear selector means in an engine starting position when the ignition system is de-activated and said selector means are shifted to said engine starting position. Indicator means responsive to the activation of the ignition system and to the unfastened state of the operator's seat belt buckles are provided for presenting the operator with a visible and/or audible indication of the seat belt condition, and means responsive to the fastening of the operator's seat belt buckles serve to de-activate said indicating means and to release said transmission selector locking means. According to a specific feature of the invention, use is made of switch means mounted on the operator's seat belt buckles for activating said alarm means when the buckle elements are unfastened regardless of the position of the selector means, and for disabling said selector locking means when the ignition system is activated and the operator's seat belt is fastened. The switch means is mounted on one buckle element and includes a first contact that is displaced between two stationary contacts by a switch actuator arranged on the other buckle element during connection and separation of the buckle elements.

In accordance with a more specific object of the invention, the transmission selector locking means comprises an axially displacable member that is continuously spring-biased into engagement with a grooved plate mounted on the transmission selector means. The plate contains a locking aperture into which the spring-biased member is guided when the selector means are shifted to the engine starting position. Solenoid means responsive to the fastening of the driver's seat belt buckle elements are operable to shift the displaceable member against the biasing means to a disabled position, whereupon the selector means are released.

According to another object of the invention, a plurality of indicating means are associated, respectively, with the various sets of seat belts in the motor vehicle. Each of the indicating means is operated by separate switch means associated with the respective seat belts, the aforementioned selector locking means being controlled only by the switch means on the driver's seat belt. The various indicating means are de-activated only upon closing of the respective seat belt buckle elements.

Other objects and advantages of the invention will become apparent from a study of the following specification when considered in conjunction with the accompanying drawing, in which:

FIGURE 1 is a detailed perspective view of the front seat area of a motor vehicle incorporating the safety system of the present invention;

FIGURE 2 is a schematic electrical diagram of the safety system;

FIGURE 3 is a detailed perspective view of the means for locking the transmission gear selector lever in the engine starting position;

FIGURE 4 is a detailed bottom view taken along line 4—4 of FIGURE 3;

FIGURE 5 is a sectional view taken along line 5—5 of FIGURE 3;

FIGURE 6 is a top plan view of the female seat belt buckle element;

FIGURE 7 is a sectional view taken along line 7—7 of FIGURE 6;

FIGURE 8 is a top plan view of the male buckle element including the three contact switch means of the invention; and FIGURE 9 is a sectional view taken along line 9—9 of FIGURE 8.

Referring now to FIGURE 1 the motor vehicle includes a dashboard 2 to which is connected for vertical pivotable movement the transmission gear selector lever 4. In the illustrated embodiment, the vehicle includes conventional automatic transmission means (not shown) that are shiftable by lever 4 between "reverse," "neutral," "drive" and "low" conditions. Also mounted on the dashboard 2 are the transmission gear indicator means 6, the ignition key switch 8, and seat belt condition indicator means 10 that will be described in greater detail below.

The front seat 12 of the vehicle is provided with driver's seat belt sections 14 and 16 having separable male and female buckle elements 18 and 20, respectively, and passenger's seat belt sections 22 and 24 having separable male and female buckle elements 26 and 28, respectively. Sections 14, 16, 22 and 24 consist of a woven belting material.

Referring now to FIGURES 2–5, in accordance with the present invention, spring-biased solenoid-operated means 30 are provided for automatically locking the selector lever 4 in the engine starting position. In the illustrated embodiment, it will be assumed that the engine is started with the selector lever 4 in the "neutral" position. Of course, in other automatic transmission arrangements, the engine may be started only when the lever is in another position (for example, a "park" position). These selector gear locking means 30 comprise a solenoid housing 32 that is secured by screws 34 to the under surface of the dashboard 2 adjacent the selector lever 4 as shown in FIGURE 4. The solenoid housing contains a solenoid 36 that controls the movement of a core or plunger 38 that is continuously biased to the right by spring means 40 as shown schematically in FIGURE 2. At its free end, the plunger is provided with an axially extending rod portion 42 that is biased into engagement with a groove 44 contained in a plate 46 secured to selector lever 4. The plunger rod 42 is continuously received within the groove 44 as the lever 4 is pivotally shifted between the various transmission gearing positions. The grooved portion of the plate 46 also contains a throughbore 50 into which the extremity of spring biased plunger rod 42 is biased when the lever 4 is in the engine starting (i.e. "neutral") position. More specifically, in the event that the solenoid 36 is in the illustrated de-energized condition and the selector lever is in a position other than the engine starting position, as lever 4 is shifted to the starting position, rod 42 is biased to the right into groove 44 by spring 40 and will eventually be received by the through-bore 50. Energization of the solenoid 36 causes plunger 38 to be shifted to the left against the counteracting force of spring 40, whereby rod portion 42 is withdrawn from bore 50 to unlock the selector lever 4.

The ignition switch 8 includes a pair of contacts (8a and 8b) one of which is connected with the positive terminal of a battery 60 and the other of which is connected with the ignition means 62 via starter switch 64. (In certain cases, of course, the starter switch may be physically incorporated as part of the key-operated ignition switch 8.)

As will be described in greater detail below, switch means 66 are mounted on the operator's male buckle element 18 and include first and second stationary contacts 70 and 72, respectively, and a movable third contact 74 in the form of a spring finger that is continuously biased (as a result of its inherent resiliency) into electrical engagement with first contact 70. First conductor means 76, including a series-connected indicator lamp 10a (which is contained in the dashboard-mounted indicator means 10 of FIGURE 1), connect stationary contact 70 with ignition switch contact 8b via junction 78. Similarly, second conductor means 80, containing the series-connected solenoid 36, connect the other stationary terminal 72 with ignition switch contact 8b via junction 78. Third conductor means 82 connect movable contact 74 with the negative terminal of battery 60 via chassis ground. If desired, an audible alarm or buzzer 84 may be connected in series in conductor means 76 intermediate junction 78 and contact 70.

Second switch means 86 are mounted on the male buckle element 26 of the front seat passenger's seat belt and include stationary and movable switch contacts 88 and 90, respectively. A fourth conductor 92, including the series-connected dashboard-mounted lamp 10b, connects stationary contact 88 with ignition switch contact 8b. A fifth conductor 94 connects contact 90 with the negative terminal of battery 60 via chassis ground.

The female buckle elements 20 and 28 are identical in construction. Referring to FIGURES 6 and 7, the buckle element 20 includes a sheet metal member 100 having a bottom wall 102 and a pair of side walls 104 between which is mounted a pivot rod 106. Pivotally mounted upon rod 106 are a connector locking member 108 and a pair of locking arms 110. Punched upwardly from the bottom wall 102 to define an opening 112 therein are a pair of reversely bent vertical projections 114 and 116. Rod 118, mounted between side walls 104, extends intermediate and parallel with the projections 114 and 116. Seat belt section 16 is connected with member 102 in a conventional manner as shown in FIGURE 7. Also punched upwardly from bottom wall 102 is a vertical central projection 120 about which is mounted a band of insulation material 122. Locking member 108 is biased in the counterclockwise direction in FIGURE 7 by means of a coil spring 126 concentrically mounted on pivot rod 106. The central portion 126a of the coil spring extends within a recess 120a in vertical projection 120, and the ends of spring 126 engage the upper surfaces of the lock arms 110. Also formed in the bottom wall 102 are a pair of apertures 128 which are arranged to receive the ends of arms 110 when the member 108 is pivoted in the counterclockwise direction to a closed position relative to member 102.

Referring now to FIGURES 8 and 9, the male buckle element 18 includes a conventional metal plate 140 having a pair of slots 142 through which the belt section 14 is inserted as shown in FIGURE 9. At each side the member 18 is provided with locking recesses 144 adapted to receive the ends of arms 110 when the connector elements are interlocked. At its free end, the member 140 contains a longitudinally extending central recess 146.

Secured to the upper surface of plate 140 by screws 148 is a generally U-shaped non-conductive contact support 150 to which are connected the three switch contacts 70, 72, and 74. The contact support is preferably formed of a hard, molded synthetic plastic material (such as "Lucite," for example). Conductors 76, 80 and 82, which are molded at one end in contact support 150, are woven in belt section 14 (as is conventional in the art) and are connected to the various circuit elements of FIGURE 2.

The male and female connector elements are connected in a conventional manner. Thus, by inserting plate 140 beneath the pivoted end of member 108 (when in the FIGURE 7 position) so that the free end of the plate extends beneath the reversely-bent projection 116 and the projection 120 is received within the recess 146, locking of the elements is effected by pivotal movement of member 108 in the counterclockwise direction. It is important to note that as projection 120 is inserted within recess 146, insulation band 122 displaces movable contact 74 out of engagement from stationary contact 70 and into engagement with stationary contact 72. Thus, connection and separation of the buckle elements effects displacement of the movable spring contact 74 between the stationary contacts 70 and 72, respectively.

The front seat passenger's buckle element 26 differs from that of the driver's side only by the omission of the normally disengaged stationary switch contact 72. Thus, switch 86 has only one stationary and one movable contact.

*Operation*

Assume that the vehicle has been stopped with the selector lever 4 in the "drive" position, that the ignition key is off, and that both front seat belts are unbuckled.

To start the vehicle, the lever 4 is shifted to the engine starting (i.e., "neutral") position, whereupon the spring-biased plunger 38 is shifted to the right to cause insertion of rod portion 42 into aperture 50. Lever 4 is now locked in the "neutral" position.

Upon closing of the key-operated ignition switch 8, buzzer 84 and lamp 10a are energized by the branch circuit path defined between the positive terminal of battery 60 and ground via switch 8, junction 78, and contacts 70 and 74. Similarly, lamp 10b is energized by the path including switch 8, junction 79 and contacts 88 and 90. Lever 4 remains locked in the engine starting position by rod 42. Should starter switch 64 now be closed to start the engine, lever 4 will continue to be locked by rod 42.

Assume now that the front seat passenger locks his seat belt buckles 26 and 28, whereupon the movable contact 90 is opened from contact 88 to de-energize lamp 10b. Lever 4 remains locked by the rod 42, and lamp 10a and buzzer 84 remain energized via switch contacts 70 and 74.

Should the vehicle operator now connect the buckle elements 18 and 20, contact 74 is displaced (by projection 120 and insulating band 122) out of engagement with contact 70 and into engagement with contact 72, whereupon buzzer 84 and lamp 10a are de-energized, and solenoid 36 is energized by the circuit path from battery to ground including switch 8, solenoid 36, and switch contacts 72 and 74. Energization of solenoid 36 causes plunger 38 and rod 42 to be displaced to the left against the biasing action of spring 40, whereupon lever 4 is unlocked to permit shifting of the transmission into any desired driving gear.

In the event that the operator should temporarily unfasten the seat belt buckles with the selector gear in a drive position (for example, to remove a handkerchief, coins, a wallet, matches or the like from a trouser pocket), contact 74 is displaced from contact 72 to contact 70, whereupon solenoid 36 is de-energized and buzzer 84 and lamp 10a are activated. The operator is now constantly advised by the indicating means that his seat belt is unfastened, but the automobile may still be driven by the operator. If at this time the lever 4 should be shifted to neutral, the spring-biased plunger rod again engages aperture 50 to lock the transmission in the neutral condition. On the other hand, if the operator merely refastens his seat belt, the indicating means are de-activated and the solenoid 36 is again energized. Since in this latter case, the lever was not shifted from a drive position to neutral, there was never any locking of the lever by the rod 42.

While the invention has been disclosed in connection with an automatic transmission arrangement having a selector lever, the invention is also applicable to automatic transmission systems of other types (for example, those incorporating push-button selector means) and to manual shift transmission systems as well.

In the case of manual shift, the solenoid plunger rod may be arranged to cooperate with the shaft or linkage connecting the gear shift lever with the transmission means.

While in accordance with the provisions of the patent statutes I have illustrated and described the best form and embodiment of the invention now known to me, it will be apparent to those skilled in the art that changes and modifications may be made in the apparatus described without deviating from the invention set forth in the following claims.

What is claimed is:
1. Safety means adapted for use with a motor vehicle having an ignition system, transmission means including gear selector means shiftable between an engine starting position and at least one drive position, and safety seat belt means including a pair of separable buckle elements for securing the operator to the driver's seat of the vehicle, comprising
   means normally locking the transmission gear selector means in the engine starting position; and
   normally de-energized solenoid means connected with the ignition system and operable in response to the connection of said buckle elements for releasing said locking means.

2. Apparatus as defined in claim 1 wherein said locking means are operable, when said ignition system is de-activated and when said selector means are initially in a position other than the engine starting position, to automatically lock and selector means upon shifting thereof to the engine starting position.

3. Apparatus as defined in claim 2 wherein said locking means comprises a first member secured to said selector means and containing an aperture, a second member movably connected with said vehicle, and spring means biasing said second member into locking engagement with said aperture, said second member being arranged relative to said first member to engage said aperture only when said selector means is in the engine starting position.

4. Apparatus as defined in claim 3 wherein said second locking member comprises an axially movable rod, wherein said first member comprises a plate arranged normal to said rod, and wherein said solenoid means include a plunger connected with said rod to displace the same against the force of said biasing means.

5. A safety seat belt system adapted for use with a motor vehicle having an ignition system including a voltage source and an ignition switch, transmission means including gear selector means shiftable between an engine starting position and at least one drive position, and safety seat belt means including a pair of separable buckle elements for securing the operator to the driver's seat of the vehicle, comprising
   means including a spring-biased member for automatically locking said selector means upon displacement thereof to the engine starting position;
   normally de-energized solenoid means operable to displace said spring-biased member to a retracted position permitting shifting of said selector means from said engine starting position;
   switch means including a stationary contact, and a movable contact normally disengaged from said stationary contact;
   conductor means connecting said stationary and movable contacts in series in a circuit path including said solenoid, said ignition switch and said voltage source; and
   means responsive to the connection of said seat buckle elements for closing the movable and stationary contacts of said switch means, whereby said solenoid means are energized when said ignition system is activated and said buckle elements are fastened.

6. A safety seat belt system adapted for use with a motor vehicle having an ignition system including a voltage source and an ignition switch, transmission means including gear selector means shiftable between an engine starting position and at least one drive position, and safety seat belt means including a pair of separable buckle elements for securing the operator to the driver's seat of the vehicle, comprising
   means including a spring-biased member for automatically locking said selector means upon displacement thereof to the engine starting position;
   normally de-energized solenoid means operable to displace the spring-biased member to a retracted position permitting shifting of the selector means from the engine starting position;
   electrically operable indicator means mounted on said vehicle adjacent the driver's seat;
   switch means including first and second stationary contacts and a movable third contact normally in electrical engagement with said first contact;
   first conductor means connecting said first and third contacts in series in a circuit path including said indicator means, said ignition switch and said voltage source;
   second conductor means connecting said second and third contacts in series in a circuit path including said solenoid, said ignition switch and said voltage source; and
   means responsive to the fastening of said seat belt buckles for displacing said third contact out of engagement with said first contact and into electrical engagement with said second contact.

7. Apparatus as defined in claim 6 wherein said switch means is mounted on one of said buckle elements and wherein said means for displacing said third contact comprises a switch actuator mounted on the other of said buckle elements.

8. A safety seat belt system adapted for use with a motor vehicle having an ignition system including a voltage source and an ignition switch, transmission means including gear selector means shiftable between an engine starting position and at least one drive position, and at least two safety seat belt means for securing the vehicle operator and a passenger to their seats, respectively, each of said seat belt means including a pair of separable buckle elements, comprising means including a spring-biased member for automatically locking said selector means upon displacement thereof to the engine starting position;

normally de-energized solenoid means operable to displace the spring-biased member to a retracted position permitting shifting of the selector means from the engine starting position;

a pair of electrically operable indicator means mounted on said vehicle adjacent the driver's seat;

first switch means including first and second stationary contacts and a movable third contact normally in electrical engagement with said first contact;

second switch means including normally closed stationary fourth and movable fifth contacts;

first conductor means connecting said first and third contacts in series in a circuit path including one of said indicator means, said ignition switch and said voltage source;

second conductor means connecting said second and third contacts in series in a circuit path including said solenoid, said ignition switch and said voltage source;

third conductor means connecting said fourth and fifth contacts in series in a circuit path including the other of said indicator means, said ignition switch and said voltage source;

means responsive to the fastening of said operator's seat belt buckle elements for displacing said third contact out of engagement with said first contact and into engagement with said second contact; and means responsive to the fastening of said passenger's seat belt buckle elements for displacing said fifth contact out of engagement with said fourth contact.

References Cited by the Applicant
UNITED STATES PATENTS

| | | |
|---|---|---|
| 1,288,906 | 12/1918 | Jensen. |
| 2,823,755 | 2/1958 | Hall. |
| 2,887,898 | 5/1959 | Jovanovich et al. |
| 3,014,549 | 12/1961 | Freeman. |
| 3,078,945 | 2/1963 | Frey. |
| 3,133,277 | 5/1964 | Hood. |
| 3,215,221 | 11/1965 | Rayman. |
| 3,226,674 | 12/1965 | Eriksson. |

KENNETH H. BETTS, *Primary Examiner*.